(12) United States Patent
Shiina

(10) Patent No.: US 12,494,707 B2
(45) Date of Patent: Dec. 9, 2025

(54) CONTROL DEVICE AND OVERCURRENT DETECTION AND TESTING METHOD FOR DC/DC CONVERTER AND MANUFACTURING METHOD FOR CONTROL DEVICE THEREOF

(71) Applicant: ABLIC Inc., Nagano (JP)

(72) Inventor: Yoshiomi Shiina, Nagano (JP)

(73) Assignee: ABLIC Inc., Nagano (JP)

( * ) Notice: Subject to any disclaimer, the term of this patent is extended or adjusted under 35 U.S.C. 154(b) by 148 days.

(21) Appl. No.: 18/592,530

(22) Filed: Mar. 1, 2024

(65) Prior Publication Data
US 2024/0297574 A1    Sep. 5, 2024

(30) Foreign Application Priority Data
Mar. 2, 2023  (JP) ................. 2023-031723

(51) Int. Cl.
*H02M 1/32*   (2007.01)
*G01R 19/00*  (2006.01)
*G01R 19/165* (2006.01)
*H02M 1/00*   (2007.01)
*H02M 3/158*  (2006.01)

(52) U.S. Cl.
CPC .......... *H02M 1/32* (2013.01); *G01R 19/0038* (2013.01); *G01R 19/16571* (2013.01); *H02M 1/0009* (2021.05); *H02M 3/158* (2013.01)

(58) Field of Classification Search
CPC ...... H02M 1/32; H02M 1/0009; H02M 3/158; H02M 1/009; G01R 19/0038; G01R 19/16571; G01R 31/40; G01R 19/165
See application file for complete search history.

(56) References Cited

U.S. PATENT DOCUMENTS

| 2008/0196480 A1* | 8/2008 | Kawase ............. G01N 27/4065 73/31.05 |
| 2009/0219661 A1* | 9/2009 | Mitsuda ............. H03K 17/0822 361/92 |

FOREIGN PATENT DOCUMENTS

JP    2019-092305    6/2019

* cited by examiner

*Primary Examiner* — Lee E Rodak
*Assistant Examiner* — Zannatul Ferdous
(74) *Attorney, Agent, or Firm* — JCIPRNET

(57) ABSTRACT

A DC/DC converter is able to test an overcurrent detection circuit without damaging the circuit. The DC/DC converter includes: a high-side switch; an IV conversion element and a current detection transistor which are connected in parallel with the high-side switch; a low-side switch; an overcurrent detection circuit; and a control circuit which outputs a first signal from a first output port to the high-side switch, outputs a second signal from the second output port to the low-side switch, and outputs a third signal from a third output port to the current detection transistor. The DC/DC converter further includes a test port which controls the current detection transistor to be turned off in the case of testing the overcurrent detection circuit, and supplies a variable current to a connection point between the current detection transistor which is controlled to be turned off and the IV conversion element.

8 Claims, 5 Drawing Sheets

CONTROL DEVICE AND OVERCURRENT DETECTION AND TESTING METHOD FOR DC/DC CONVERTER AND MANUFACTURING METHOD FOR CONTROL DEVICE THEREOF

CROSS-REFERENCE TO RELATED APPLICATION

This application claims the priority benefits of Japanese application no. 2023-031723, filed on Mar. 2, 2023. The entirety of the above-mentioned patent application is hereby incorporated by reference herein and made a part of this specification.

BACKGROUND

Technical Field

The present invention relates to a control device and an overcurrent detection and testing method for a direct current to direct current (DC/DC) converter and a manufacturing method for a control device for a DC/DC converter.

Description of Related Art

An overcurrent detection circuit which detects a current flowing through a high-side switch of a DC/DC converter is configured to be able to detect a current larger than a normal operating current for overcurrent protection.

FIG. 5 is a block diagram illustrating a DC/DC converter including a conventional overcurrent detection circuit.

A control circuit 5 simultaneously turns on or off a PMOS transistor MP1, which is a high-side switch, and a PMOS transistor MP2, which is a current detection transistor, using a signal φ1, and turns on or off an NMOS transistor MN1 using a signal φ2. An overcurrent detection circuit 4 measures a voltage generated across a resistor R1 using an operational amplifier in the case of the PMOS transistor MP2 passing a sense current proportional to the current flowing through the PMOS transistor MP1, and outputs a detection signal to the control circuit 5 (for example, see Patent Literature 1 (Japanese Patent Application Laid-Open No. 2019-92305)).

Although it is expected to ensure that the overcurrent detection circuit of the DC/DC converter had the intended performance, such as being able to detect an overcurrent which was larger than a normal output current, and operating reliably due to the overcurrent protection function, if an overcurrent larger than the normal output current was applied during the testing process, there was a possibility of damaging the DC/DC converter.

The present invention provides a control device and an overcurrent detection and testing method for a DC/DC converter and a manufacturing method for a control device for a DC/DC converter that can test an overcurrent detection circuit which detects an overcurrent without damaging the DC/DC converter.

SUMMARY

A control device for a DC/DC converter of the present invention includes: a high-side switch; an IV conversion element and a current detection transistor which are connected in parallel with the high-side switch; a low-side switch; and an overcurrent detection circuit which detects a current flowing to an output port based on a voltage across the IV conversion element and outputs a detection signal; and a control circuit, to which the detection signal is input, outputs a first signal from a first output port to the high-side switch, outputs a second signal from a second output port to the low-side switch, and outputs a third signal from a third output port to the current detection transistor. The control device for the DC/DC converter of the present invention further includes a test port which controls the current detection transistor to be turned off in the case of testing the overcurrent detection circuit, and supplies a variable current to a connection point between the current detection transistor which is controlled to be turned off and the IV conversion element.

According to the control device, the overcurrent detection and testing method, and the manufacturing method for the DC/DC converter of the present invention, the overcurrent detection circuit can be tested with the high-side switch being turned off, and no damage is caused to the DC/DC converter during the testing process.

DESCRIPTION OF THE EMBODIMENTS

Hereinafter, a control device and an overcurrent detection and testing method for a DC/DC converter and a manufacturing method for a control device for a DC/DC converter according to an embodiment of the present invention will be described with reference to the drawings.

Figure 1:
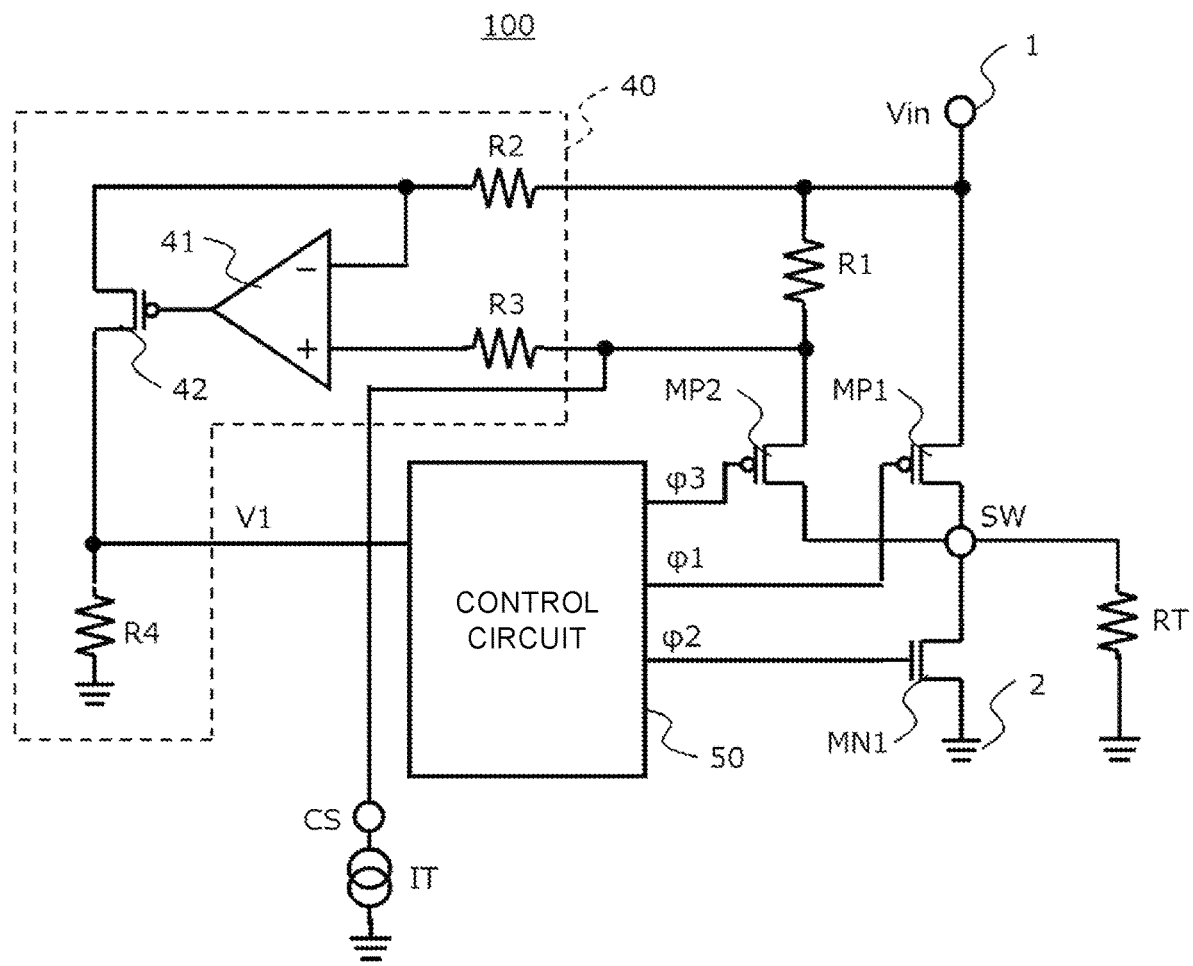
FIG. 1 is a block diagram illustrating a first configuration example of a control device for a DC/DC converter according to an embodiment.

FIG. 1 is a block diagram of a control device 100 for a DC/DC converter, which is a first configuration example of the control device for the DC/DC converter of the embodiment.

The control device 100 for the DC/DC converter includes a power supply port 1, a ground port 2, an output port SW, a test port CS, and a PMOS transistor MP1 which is a high-side switch, an NMOS transistor MN1 which is a low-side switch, a PMOS transistor MP2 which is a current detection transistor, a resistor R1 which is an IV conversion element, an overcurrent detection circuit 40, and a control circuit 50. The overcurrent detection circuit 40 includes an amplifier 41, a PMOS transistor 42, and resistors R2, R3, and R4.

The PMOS transistor MP1 has a source connected to the power supply port 1 and a drain connected to the output port SW. The NMOS transistor MN1 has a source connected to the ground port 2 and a drain connected to the output port SW. The resistor R1 and the PMOS transistor MP2 are connected in parallel with the PMOS transistor MP1. The amplifier 41 has an inverting input port connected to one end of the resistor R1 via the resistor R2, and a non-inverting input port connected to the other end of the resistor R1 via the resistor R3. The PMOS transistor 42 has a source connected to the inverting input port of the amplifier 41, a gate connected to an output port of the amplifier 41, and a drain connected to one end of the resistor R4. The other end of the resistor R4 is connected to the ground port 2. The control circuit 50 has an input port connected to one end of the resistor R4, a first output port connected to a gate of the PMOS transistor MP1, a second output port connected to a gate of the NMOS transistor MN1, and a third output port connected to a gate of the PMOS transistor MP2. The test port CS is connected to the other end of the resistor R1.

The control circuit 50 inputs a voltage V1 generated at one end of the resistor R4 to the input port, and outputs a signal φ1 from the first output port, a signal φ2 from the second output port, and a signal φ3 from the third output port. Other input signals and output signals of the control circuit 50, other circuits as a control device for a DC/DC converter, etc. are omitted for the sake of simplification of description.

Further, during normal operation, the PMOS transistor MP2 passes a small current (sense current) proportional to the output current passed by the PMOS transistor MP1. Thus, the PMOS transistor MP2 is designed to have, for example, a smaller gate width than the PMOS transistor MP1.

The control device 100 for the DC/DC converter configured as described above operates as follows to test the overcurrent detection circuit. Here, in testing the overcurrent detection circuit, a current source which flows a variable current IT is connected to the test port CS. Further, the output port SW is connected to a resistor RT for pull down and also serves as an output port for a detection signal.

Figure 2:
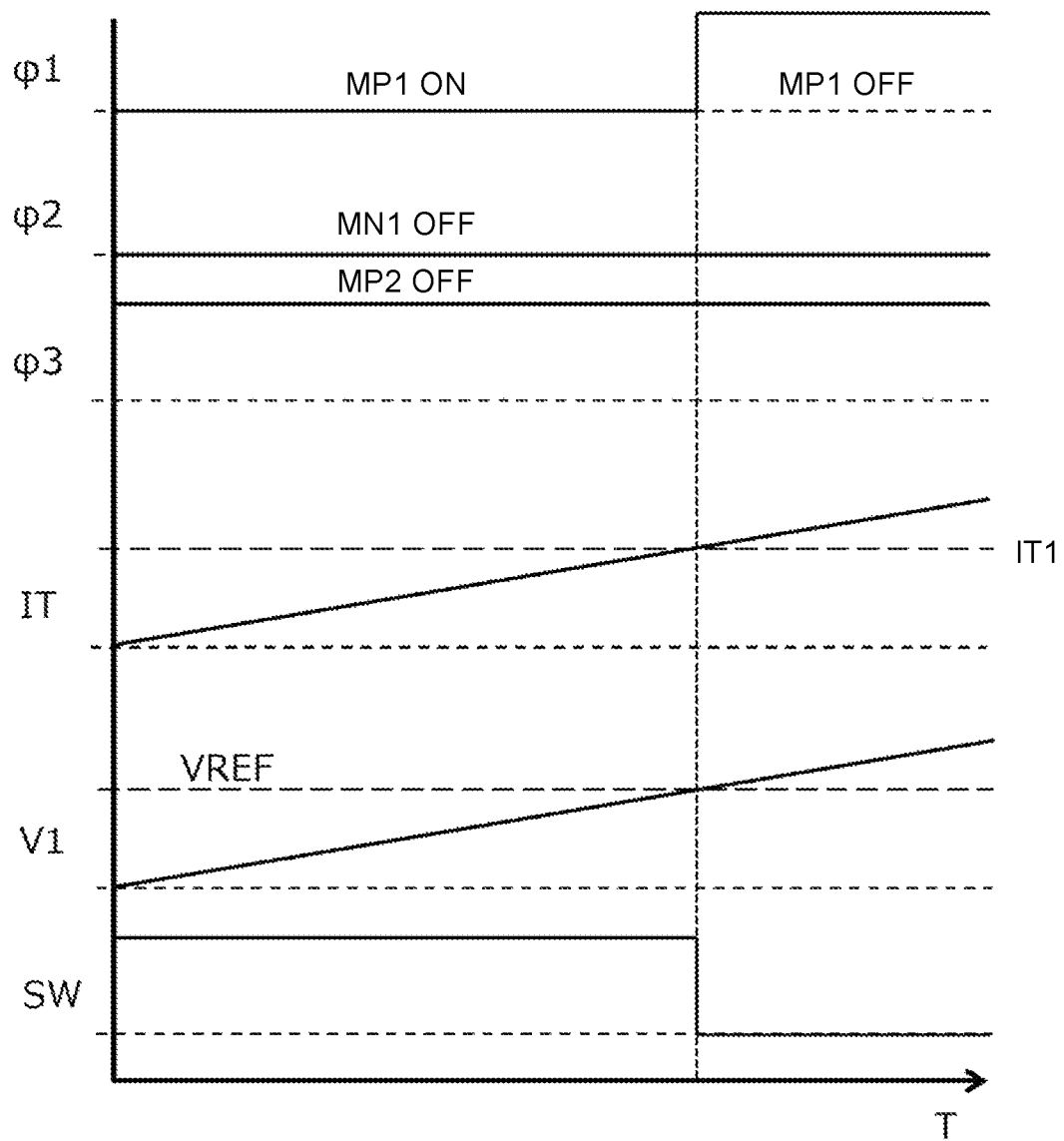
FIG. 2 is a timing chart illustrating the operation of the first configuration example of the control device for the DC/DC converter according to the embodiment.

FIG. 2 is a timing chart illustrating the operation of the control device 100 for the DC/DC converter.

In the state at time T=0, that is, in the initial state, the control circuit 50 sets the signal φ1 to Lo, the signal φ2 to Lo, and the signal φ3 to Hi. Thus, the PMOS transistor MP1 is turned on, the NMOS transistor MN1 is turned off, and the PMOS transistor MP2 is turned off. The output port SW is pulled up to the power supply port 1 by the PMOS transistor MP1. By pulling up the output port SW to the power supply port 1, an output signal having a signal level of Hi is output from the output port SW.

In the state, a current source connected to the test port CS causes a variable current IT to flow from 0 to gradually increase. Since the variable current IT flows through the resistor R1 from the power supply port 1 to the test port CS, the voltage at both ends gradually increases. As the voltage across the resistor R1 gradually increases, the output voltage of the amplifier 41 gradually decreases. Thus, the current flowing through the resistor R4 increases, and the voltage V1 gradually increases. The voltage V1 exceeds a reference voltage VREF at time T1. That is, at the time T1, an overcurrent state (exceeding a current value IT1) is detected.

In the case of detecting an overcurrent state, the control circuit 50 changes the signal φ1 from Lo to Hi to turn off the PMOS transistor MP1. Since the PMOS transistor MP1 is turned off, the output port SW is pulled down to the ground port 2 by the resistor RT. By pulling down the output port SW to the ground port 2 by the resistor RT, an output signal having a signal level of Lo is output from the output port SW.

At this time, the variable current IT flowing through the resistor R1 is a minute current proportional to the current flowing through the PMOS transistor MP1. Thus, a large current does not flow inside the control device 100 for the DC/DC converter.

As described above, the overcurrent detection circuit can be tested by flowing the variable current IT which is minute through the resistor R1 with the state of the PMOS transistor MP1 and the PMOS transistor MP2 being turned off. Thus, the control device 100 for the DC/DC converter can test the overcurrent detection circuit without causing an overcurrent to flow through the high-side switch, and the DC/DC converter is not damaged.

Figure 3:
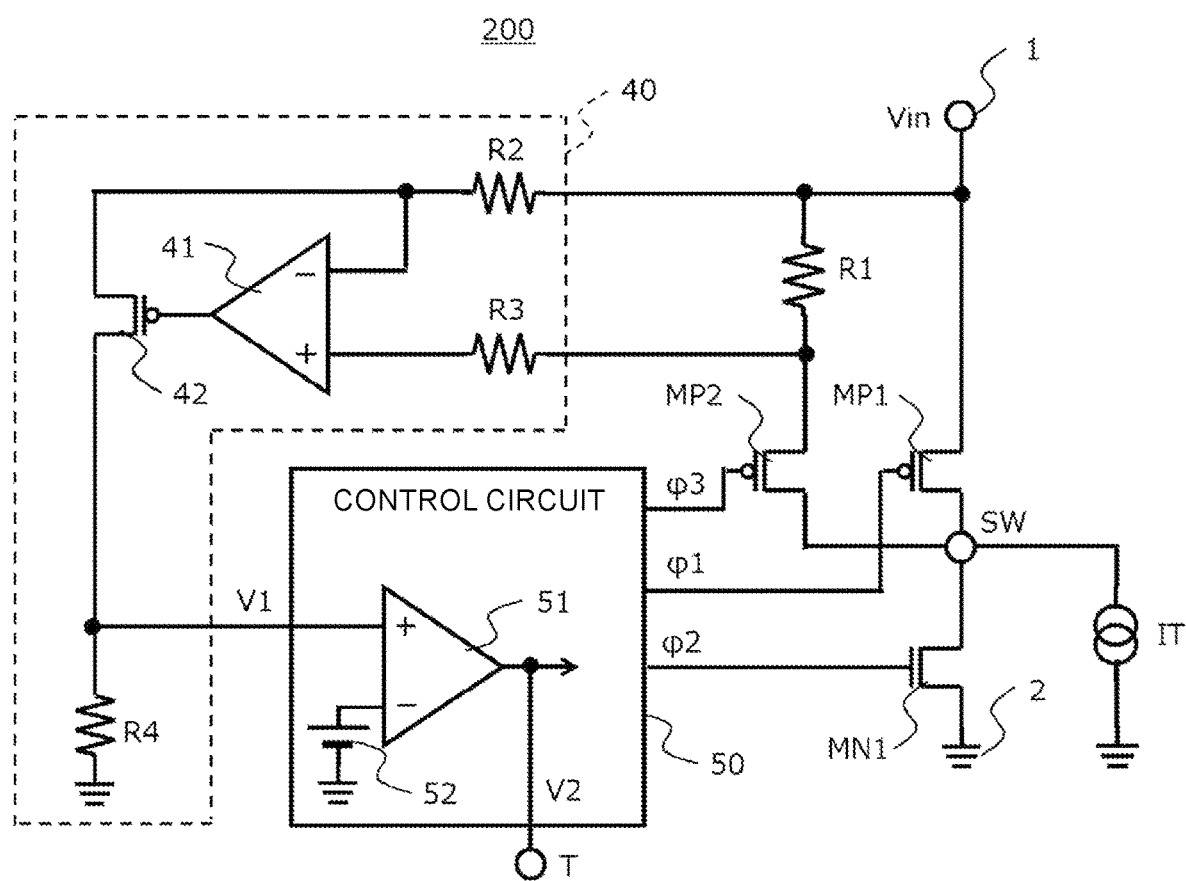
FIG. 3 is a block diagram illustrating a second configuration example of the control device for the DC/DC converter according to the embodiment.

FIG. 3 is a block diagram of a control device 200 for a DC/DC converter, which is a second configuration example of the control device for the DC/DC converter of the embodiment.

The control device 200 for the DC/DC converter includes the power supply port 1, the ground port 2, the output port SW, a test port T, and the PMOS transistor MP1 which is a high-side switch, the NMOS transistor MN1 which is a low-side switch, the PMOS transistor MP2 which is a current detection transistor, the resistor R1 which is an IV conversion element, the overcurrent detection circuit 40, and the control circuit 50. The overcurrent detection circuit 40 includes the amplifier 41, the PMOS transistor 42, and the resistors R2, R3, and R4. The control circuit 50 includes a comparator 51 and a reference voltage circuit 52.

The PMOS transistor MP1 has the source connected to the power supply port 1 and the drain connected to the output port SW. The NMOS transistor MN1 has the source connected to the ground port 2 and the drain connected to the output port SW. The PMOS transistor MP2 and the resistor R1 are connected in parallel with the PMOS transistor MP1. The amplifier 41 has the inverting input port connected to one end of the resistor R1 via the resistor R2, and the non-inverting input port connected to the other end of the resistor R1 via the resistor R3. The PMOS transistor 42 has the source connected to the inverting input port of the amplifier 41, the gate connected to the output port of the amplifier 41, and the drain connected to one end of the resistor R4. The other end of the resistor R4 is connected to the ground port 2.

The control circuit 50 has one end of the resistor R4 connected to a non-inverting input port of the comparator 51 via the input port, the first output port connected to the gate of the PMOS transistor MP1, the second output port connected to the gate of the NMOS transistor MN1, and the third output port connected to the gate of the PMOS transistor MP2. The comparator 51 has an inverting input port connected to an output port of the reference voltage circuit 52, and an output port connected to the test port T. Other input signals and output signals of the control circuit 50, other circuits as a control device for a DC/DC converter, etc. are omitted for the sake of simplification of description.

The control device 200 for the DC/DC converter configured as described above operates as follows to test the overcurrent detection circuit. Here, in testing the overcurrent detection circuit, a current source which flows the variable current IT is connected to the output port SW. Further, the test port T outputs an overcurrent detection signal V2.

Figure 4:
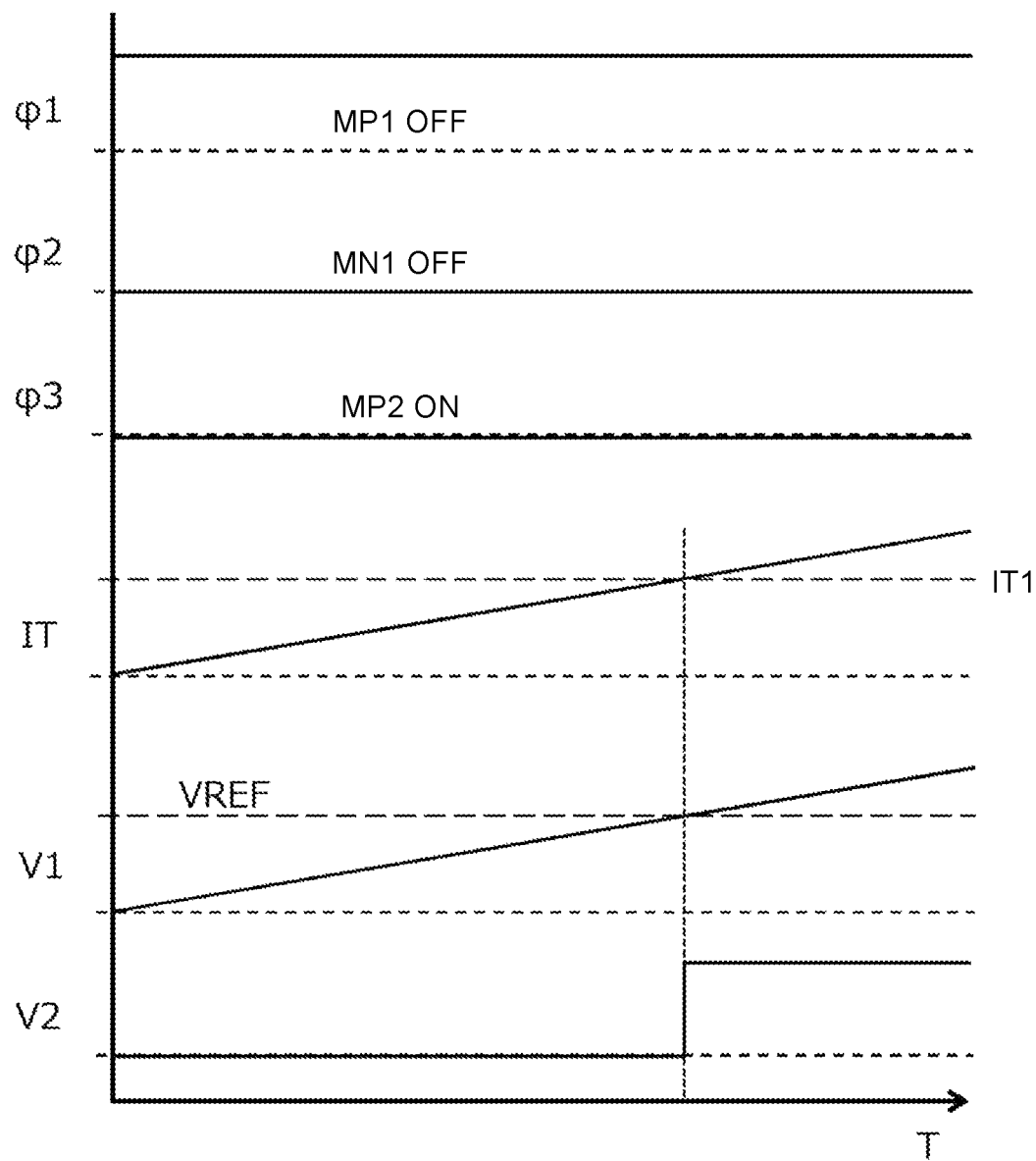
FIG. 4 is a timing chart illustrating the operation of the second configuration example of the control device for the DC/DC converter according to the embodiment.
Figure 5:
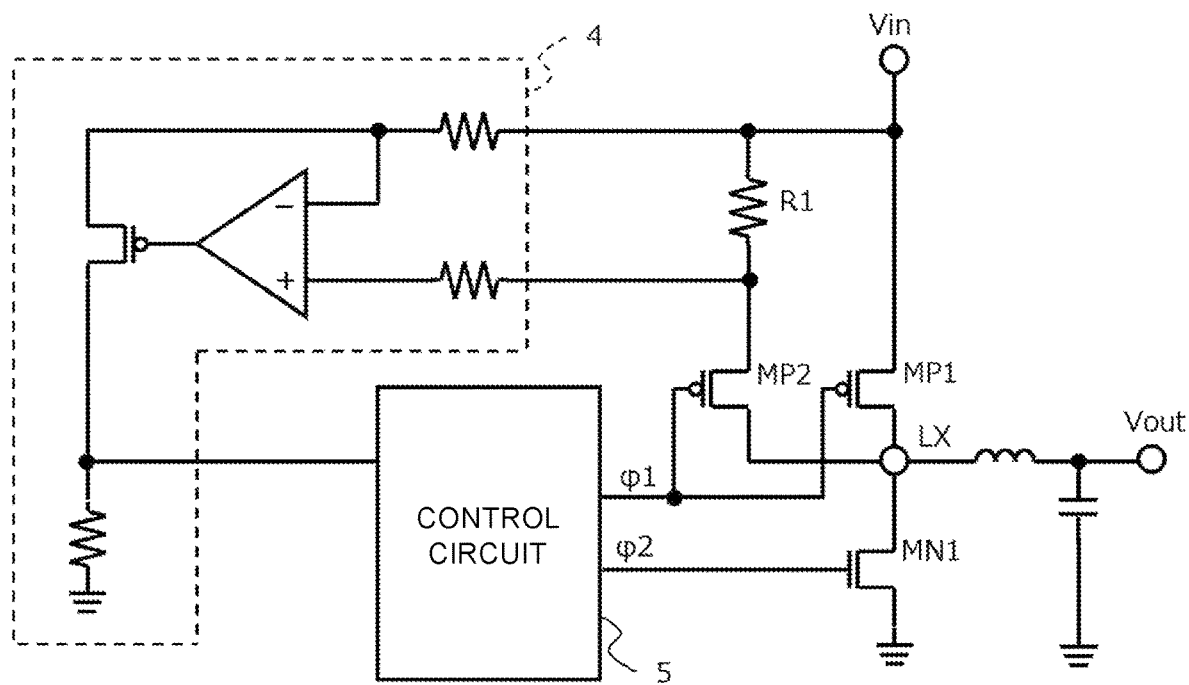
FIG. 5 is a block diagram illustrating a conventional DC/DC converter.

FIG. 4 is a timing chart illustrating the operation of the control device 200 for the DC/DC converter.

In the initial state (time T=0), the control circuit 50 sets the signal φ1 to Hi, the signal φ2 to Lo, and the signal φ3 to Lo. Thus, the PMOS transistor MP1 is turned off, the NMOS transistor MN1 is turned off, and the PMOS transistor MP2 is turned on. Since the variable current IT is not flowing, no voltage is generated across the resistor R1. Thus, the voltage V1 at one end of the resistor R4 is lower than the reference voltage VREF of the reference voltage circuit 52, the overcurrent detection signal V2 at the test port T is at Lo, which is the same signal level as an output port of the comparator 51.

In the state, a current source connected to the output port SW causes the variable current IT to flow from 0 to gradually increase. Since the PMOS transistor MP2 is on, the variable current IT flows through the resistor R1 from the power supply port 1 to the output port SW, and the voltage at both ends gradually increases. As the voltage across the resistor R1 gradually increases, the output voltage of the amplifier 41 gradually decreases. Thus, the current flowing through the resistor R4 increases, and the voltage V1 gradually increases. The voltage V1 exceeds the reference voltage VREF at the time T1. That is, at the time T1, an overcurrent state (exceeding the current value IT1) is detected.

In the case of the control circuit 50 detecting an overcurrent state, the comparator 51 outputs Hi. Thus, the overcurrent detection signal V2 of the test port T becomes Hi.

At this time, the variable current IT flowing through the resistor R1 is a minute current proportional to the current flowing through the PMOS transistor MP1. Thus, in the control device 200 for the DC/DC converter, a large current does not flow through the PMOS transistor MP1 and the PMOS transistor MP2.

As described above, the overcurrent detection circuit can be tested by flowing the variable current IT which is minute through the resistor R1 with the state of the PMOS transistor MP1 being turned off. Thus, the control device 200 for the DC/DC converter can test the overcurrent detection circuit without causing an overcurrent to flow through the high-side switch, and the DC/DC converter is not damaged.

Although the embodiment of the present invention has been described above, the present invention is not limited to the above embodiment, and various changes can be made without departing from the spirit of the present invention. For example, part or all of the control devices 100 and 200 for the DC/DC converter may be a semiconductor integrated circuit formed and integrated on a semiconductor substrate.

For example, the overcurrent detection circuit 40 may detect an overcurrent based on the voltage of the resistor R1, and is not limited to the circuit of the embodiment. Further, the resistor R1 may be an IV (current-voltage) conversion element and is not limited thereto. Furthermore, although the pull-down resistor RT is connected to the output port SW in the control device 100 for the DC/DC converter, a pull-up resistor may be connected to turn the low-side switch on or off. Other logics can also be changed without being limited to the description of the embodiment.

What is claimed is:

1. A control device for a DC/DC converter, comprising a power supply port, a ground port, and an output port, the converter control device for the DC/DC converter comprising:
    a high-side switch, connected between the power supply port and the output port;
    an IV conversion element and a current detection transistor, connected in parallel with the high-side switch;
    a low-side switch, connected between the output port and the ground port;
    an overcurrent detection circuit, detecting a current flowing to the output port based on a voltage across the IV conversion element and outputting a detection signal;
    a control circuit, to which the detection signal is input, outputting a first signal from a first output port to the high-side switch, outputting a second signal from a second output port to the low-side switch, and outputting a third signal from a third output port to the current detection transistor; and
    a test port, which is a port supplying a variable current in the case of testing the overcurrent detection circuit, connected to a connection point between the IV conversion element and the current detection transistor which is turned off.

2. The control device for the DC/DC converter according to claim 1, wherein
    a pull-down resistor is connected to the output port, controls the high-side switch to be on or off, and outputs an overcurrent detection signal.

3. The control device for the DC/DC converter according to claim 1, wherein
    a pull-up resistor is connected to the output port, controls the low-side switch to be on or off, and outputs an overcurrent detection signal.

4. A control device for a DC/DC converter, comprising a power supply port, a ground port, and an output port, the control device for the DC/DC converter comprising:
    a high-side switch, connected between the power supply port and the output port, and controlled to be turned off in the case of testing an overcurrent detection circuit;
    an IV conversion element and a current detection transistor, connected in parallel with the high-side switch;
    a low-side switch, connected between the output port and the ground port, and controlled to be turned off in the case of testing the overcurrent detection circuit;
    an overcurrent detection circuit, detecting a current flowing to the output port based on a voltage across the IV conversion element and outputting a detection signal; and
    a control circuit, comprising a comparator which compares the detection signal input with a reference voltage, outputting a first signal from a first output port to the high-side switch, outputting a second signal from a second output port to the low-side switch, and outputting a third signal from a third output port to the current detection transistor,
    the current detection transistor being controlled to be turned on in the case of testing the overcurrent detection circuit, and
    the output port supplying a variable current in the case of testing the overcurrent detection circuit.

5. An overcurrent detection and testing method for a DC/DC converter, being an overcurrent detection and testing method for a control device for the DC/DC converter, and the control device for the DC/DC converter comprising: a high-side switch connected between a power supply port and an output port; an IV conversion element and a current detection transistor connected in parallel with the high-side switch; a low-side switch connected between the output port and the ground port; an overcurrent detection circuit detecting a current flowing to the output port based on a voltage across the IV conversion element and outputting a detection signal; and a control circuit, to which the detection signal is input, outputting a first signal from a first output port to the high-side switch, outputting a second signal from a second output port to the low-side switch, and outputting a third signal from a third output port to the current detection transistor,
    the overcurrent detection and testing method for the DC/DC converter comprising:
    turning off the current detection transistor; and supplying a variable current to a connection point between the current detection transistor which is turned off and the IV conversion element.

6. The overcurrent detection and testing method for the DC/DC converter according to claim 5, further comprising:
connecting a pull-down resistor to the output port; and turning on or off the high-side switch.

7. The overcurrent detection and testing method for the DC/DC converter according to claim 5, further comprising:
connecting a pull-up resistor to the output port; and turning on or off the low-side switch.

8. A manufacturing method for a control device for a DC/DC converter, the control device for the DC/DC converter comprising:
a high-side switch connected between a power supply port and an output port; an IV conversion element and a current detection transistor connected in parallel with the high-side switch; a low-side switch connected between the output port and the ground port; an overcurrent detection circuit detecting a current flowing to the output port based on a voltage across the IV conversion element and outputting a detection signal; and a control circuit, to which the detection signal is input, outputting a first signal from a first output port to the high-side switch, outputting a second signal from a second output port to the low-side switch, and outputting a third signal from a third output port to the current detection transistor, the manufacturing method for the control device for the DC/DC converter comprising:

a process of forming the control device for the DC/DC converter on a semiconductor substrate; and a process of testing the control device for the DC/DC converter formed in the process of forming on the semiconductor substrate by the overcurrent detection and testing method according to claim 5.

* * * * *